United States Patent [19]

Rumon et al.

[11] Patent Number: 5,166,300
[45] Date of Patent: Nov. 24, 1992

[54] NON-YELLOWING POLYURETHANE ADHESIVES

[75] Inventors: Kenneth A. Rumon; Walter C. Wilhelm; Dennis J. Damico, all of Erie, Pa.

[73] Assignee: Lord Corporation, Erie, Pa.

[21] Appl. No.: 556,600

[22] Filed: Jul. 20, 1990

[51] Int. Cl.⁵ .................. C08G 18/12; C09J 175/04
[52] U.S. Cl. ............................... 528/65; 528/66; 528/77; 528/80; 528/81; 528/84; 528/85; 156/327; 156/331.7
[58] Field of Search ............... 528/52, 53, 28, 77, 528/66, 65, 85, 80, 81; 156/327, 331.7

[56] References Cited

U.S. PATENT DOCUMENTS

| | | | |
|---|---|---|---|
| 3,642,943 | 2/1972 | Noel | 260/859 R |
| 3,912,680 | 10/1975 | Oertel et al. | 260/29.2 TN |
| 4,112,017 | 9/1978 | Howard | 260/859 R |
| 4,133,723 | 1/1979 | Howard | 204/15 |
| 4,284,751 | 8/1981 | Hutt et al. | 528/45 |
| 4,507,443 | 3/1985 | Barron et al. | 528/28 |
| 4,511,626 | 4/1985 | Schumacher | 528/52 |
| 4,623,709 | 11/1986 | Bauriedel | 528/65 |
| 4,675,237 | 6/1987 | Bravet et al. | 428/425.6 |
| 4,687,533 | 8/1987 | Rizk et al. | 528/28 |
| 4,705,840 | 11/1987 | Buckanin | 528/53 |
| 4,876,308 | 10/1989 | Melby et al. | 524/780 |
| 4,891,269 | 1/1990 | Markevka et al. | 428/423 |
| 4,904,706 | 2/1990 | Uenishi et al. | 521/164 |

*Primary Examiner*—John Kight, III
*Assistant Examiner*—John M. Cooney, Jr.
*Attorney, Agent, or Firm*—W. Graham Buie

[57] ABSTRACT

A non-yellowing urethane adhesive based on a polyurethane prepolymer which is prepared by reacting a specific combination of polyhydroxy compounds and an isocyanate compound. The polyhydroxy compounds include a polyalkylene ether diol, a polyalkylene ether triol, and a polyester polyol. The combination of these polyhydroxy compounds and an isocyanate compound results in an adhesive composition which has exceptionally good resistance to high temperature, humidity, and sustained UV radiation, particularly when applied to fabric-like materials.

18 Claims, No Drawings

NON-YELLOWING POLYURETHANE ADHESIVES

FIELD OF THE INVENTION

This invention relates to the bonding of substrates with the use of appropriate adhesive compositions. More specifically, the present invention relates to polyurethane prepolymers derived from certain diisocyanate compounds and certain polyhydroxy compounds and the use of the polyurethane prepolymers to prepare adhesive bonds that are resistant to heat, humidity and UV radiation.

BACKGROUND OF THE INVENTION

Many different types of polyurethane-based adhesives have been previously developed for particular applications or uses and polyurethane prepolymers have become increasingly popular for use in these polyurethane-based adhesives. Polyurethane prepolymers are typically prepared by reacting an excess of a diisocyanate compound with a polyhydroxy compound to form a "prepolymer" which contains free isocyanate groups. The free isocyanate groups of the polyurethane prepolymer can then be crosslinked or cured as desired by exposure to moisture, the use of various crosslinking agents, or the like.

U.S. Pat. No. 4,623,709 discloses the preparation of polyurethane prepolymers having a low amount of unreacted diisocyanates by reacting an asymmetrical diisocyanate with a polyhydric alcohol to form a reaction product which is then combined with a symmetrical diisocyanate. Various polyhydric alcohols mentioned for use in reaction with the diisocyanate compound include OH-functional polyesters, OH-functional polyethers, and short chain diols, triols, and tetraols.

U.S. Pat. No. 4,891,269 discloses a method of employing an adhesive containing a film forming ethylene-vinyl copolymer, a polyurethane prepolymer, a polymeric tackifier and antioxidant. The polyurethane prepolymer is prepared from aromatic polyisocyanates and a polyhydroxy compound having a hydroxyl number and molecular weight sufficient to obtain an appropriate viscosity. Various polyhydroxy compounds mentioned for use in forming the prepolymer include polyoxyalkylene compounds, polybutadiene diols, hydroxyl-containing polyesters, hydroxyl-containing polyester amides, and polyalkylene ether glycol compounds.

U.S. Pat. No. 4,675,237 discloses an adhesive layer used in the manufacture of laminated glasses. The adhesive layer contains a cold polymerizable polyurethane formed from an isocyanate component comprising a monoisocyanate with a double ethylene bond and from a polyol component and at least one polymerization initiator. Various hydroxy compounds described for use as the polyol component include polyetherpolyols, polyesterpolyols, polycaprolactones, polycarbonatepolyols, polyesterpolycarbonatepolyols, and polybutadienes with hydroxyl or carboxyl functionality.

U.S. Pat. No. 3,642,943 discloses a solution of polymeric material which contains a mixture of an isocyanate-containing urethane prepolymer and a copolymer of an acrylic monomer and an adduct of an organo diisocyanate and a hydroxyl alkyl acrylic monomer. The isocyanate-containing urethane prepolymer is prepared by reacting an organo diisocyanate and a polyol or a mixture of polyols. Various polyols described as being useful in forming the urethane prepolymer include polyetherpolyols prepared by the addition polymerization of ethylene oxide and/or propylene oxide and a polyol like trimethylol propane. Other polyols mentioned include polyesterpolyols prepared by copolymerizing a low molecular weight polyol with a polycarboxylic acid.

U.S. Pat. No. 4,112,017 describes radiation curable coating compositions based on unsaturated addition polymerizable urethane resins. The urethane resins are prepared from a polyisocyanate compound, an unsaturated addition polymerizable monomeric compound, and a polyester polyol. The polyester polyol is the reaction product of 1,3-butylene glycol or neopentyl glycol, adipic acid, isophthalic acid, and an aliphatic polyol having at least three hydroxyl groups.

U.S. Pat. No. 4,133,723 discloses energy curable compositions based on at least one unsaturated urethane resin. The resin is the reaction product of a polyisocyanate compound, a poly(alkylene oxide)polyol, and an unsaturated addition polymerizable monomeric compound. The resin is utilized in combination with a reactive diluent system, an aromatic photosensitizer, and an aromatic photoinitiator.

It has been found that many of the previously known polyurethane adhesives based on polyurethane prepolymers such as those described above do not fare well when applied to opaque, transparent or translucent materials such as window shades or various outdoor fabrics that are exposed to high heat, high humidity, and prolonged natural or artificial UV radiation. Specifically, traditional polyurethane prepolymer-based adhesives have a tendency to discolor, depolymerize, and/or hydrolyze upon prolonged exposure to environmental conditions such as high heat, high humidity, and sustained UV radiation. Additionally, many of the previous polyurethane prepolymer-based adhesives are not capable of selectively bonding thin layers of materials such as sheer fabrics without diffusing or blocking onto adjacent layers of fabric not intended to be bonded. This tendency to diffuse or block onto other layers of fabric creates significant problems when attempting to bond only selected layers of a multi-fold fabric or the like.

A need therefore exists for a polyurethane adhesive that can effectively be applied to fabric-like materials to produce adhesive bonds that will withstand high heat, high humidity and sustained UV radiation. The need for this type of adhesive is particularly strong in industries that produce transparent or light colored fabric-like materials such as window shades which are continuously exposed to sunlight, high temperatures and/or humidity.

SUMMARY OF THE INVENTION

The present invention is a polyurethane adhesive based on polyurethane prepolymers that can effectively be applied to fabric-like materials to create adhesive bonds that will withstand high heat, high humidity, and sustained UV radiation. The present adhesive is based on a polyurethane prepolymer which is prepared from a certain combination of polyhydroxy compounds and an isocyanate compound. Specifically, the polyurethane prepolymer is prepared by reacting a polyalkylene ether diol, a polyalkylene ether triol, a polyester polyol, and an isocyanate compound. It has presently been discovered that a polyurethane prepolymer prepared from this particular combination of polyols and an isocyanate compound results in an adhesive composition that meets the needs described above.

DETAILED DESCRIPTION OF THE INVENTION

The polyurethane adhesive of the present invention is based on a polyurethane prepolymer prepared from certain polyhydroxy compounds and an aliphatic isocyanate compound that can be utilized to create adhesive bonds that will withstand sustained environmental exposure to heat, humidity and UV radiation. Specifically, the polyurethane prepolymer of the present invention is prepared by reacting a polyalkylene ether diol, a polyalkylene ether triol, a polyester polyol, and an isocyanate compound under reaction conditions sufficient to produce a polyurethane prepolymer that will exhibit sustained environmental resistance.

The isocyanate compound of the present invention can essentially be any non-aromatic, cyclic or linear aliphatic organic isocyanate compound having an isocyanate functionality of from two to four, preferably from two to three. Thus, any known polyisocyanates such as alkyl and alkylene polyisocyanates, cycloalkyl and cycloalkylene polyisocyanates and combinations thereof can be employed in the present invention. Typical aliphatic isocyanate compounds useful in the present invention include bis(4-isocyanatocyclohexyl)methane, hexamethylene diisocyanate, 2,2,4-trimethylhexamethylene-1,6-diisocyanate, isophorone diisocyanate, hexamethylene-1,6-diisocyanate (including dimers and trimers thereof), 1,4-cyclohexane diisocyanate, 1,4-bis(isocyanatomethyl)cyclohexane, m-xylene diisocyanate, and other polyisocyanate resins having a functionality of from two to four. Diisocyanate compounds are preferred, in general, with bis(4-isocyanatocyclohexyl)methane being particularly preferred. The isocyanate compound also preferably has a molecular weight of between about 160 and 400, preferably between about 200 and 300. The isocyanate compound is utilized in the present invention in an amount ranging from about 20 to 70 percent, preferably from about 30 to 65 percent by weight of the total urethane prepolymer composition.

Essential to the performance of the adhesives of the present invention is the utilization of a specific combination of polyhydroxy compounds for reacting with the aliphatic isocyanate compound. Specifically, the present invention utilizes a polyalkylene ether diol compound characterized in that the polyalkylene ether diol is a straight chain compound having a hydroxyl functionality of two. The polyalkylene ether diols of the invention can be prepared by reacting cyclic ethers such as alkylene oxides, tetrahydrofuran or dioxolane with difunctional hydroxy compounds such as ethylene glycol, 1,3-butane diol or 1,4-butane diol in ring-opening reactions well known in the art. It is essential to utilize a difunctional hydroxy compound to ensure that the resulting polyalkylene ether diol has a hydroxyl functionality of two. Examples of such polyalkylene ether diols include polytetramethylene ether diol, polyethylene ether diol, polypropylene ether diol, polybutylene ether diol, and polyethylene propylene ether diol, with polytetramethylene ether diol being presently preferred. The molecular weight of the polyalkylene ether diol can range from about 500 to 2000, but is preferably in the range from about 600 to 1000. It is also preferable in the present invention to utilize a polyalkylene ether diol, which, when reacted with an isocyanate compound of the present invention, will produce a urethane polymer having a glass transition temperature between about −70° F. and −20° F., preferably between about −40° F. and −60° F. (hereinafter referred to as the urethane polymer glass transition temperature). The polyalkylene ether diol is utilized in an amount ranging from about 40 to 60, preferably from about 25 to 50 percent by weight of the total urethane prepolymer composition.

The present invention also utilizes a polyalkylene ether triol characterized in that the polyalkylene ether triol is a branched compound having a hydroxyl functionality of three. The polyalkylene ether triols of the present invention can be prepared by reacting cyclic ethers such as alkylene oxides (e.g., ethylene oxide, propylene oxide, butylene oxide, etc.), tetrahydrofuran or dioxolane with trifunctional hydroxy compounds such as trimethylol propane, 1,2,6-hexane triol, glycerol or the like in ring-opening reactions well known in the art. Typical polyalkylene ether triols include polypropylene ether triol, polybutylene ether triol, polyethylene ether triol, polytetramethylene ether triol, and polyethylene propylene ether triol, with polypropylene ether triol being presently preferred. The molecular weight of the polyalkylene ether triol can range from about 200 to 3000, but is preferably in the range from about 300 to 900. It is also preferable in the present invention to utilize a polyalkylene ether triol having a urethane polymer glass transition temperature of between about −70° F. and −20° F., preferably between about −40° F. and −60° F. The polyalkylene ether triol is utilized in the present invention in an amount ranging from about 1 to 30, preferably from about 10 to 25 percent by weight of the total urethane prepolymer composition.

The present invention further utilizes a polyester polyol such as those formed by the reaction of lactones or carboxylic acids with multi-functional hydroxy compounds. The carboxylic acid-based polyester polyols of the invention can be prepared according to methods known in the art by reacting carboxylic acids such as succinic acid, adipic acid, suberic acid, azelaic acid, sebacic acid, phthalic acid, isophthalic acid or terephthalic acid with multi-functional hydroxy compounds such as ethylene glycol, diethylene glycol, 1,4-butane diol, 1,3-propane diol, 1,6-hexane diol, trimethylol propane, glycerol, erythritol, pentaerythritol, poly(ethylene oxide) diol, poly(ethylene oxide/propylene oxide) diol and poly(tetramethylene oxide) diol in various combinations well known in the art. Presently preferred caroxylic acid-based polyester polyols include 1,6-hexane diol phthalate polyester diol, 1,6-hexane diol adipate diol, and 1,6-hexane diol ethylene glycol adipate diol.

The present lactone-based polyester polyols are prepared according to methods known in the art by reacting a lactone such as caprolactone with a multi-functional hydroxy compound as defined immediately above. A particularly preferred lactone-based polyester polyol, which is also preferred over the carboxylic acid-based polyester polyols in general, is a polycaprolactone triol prepared from the reaction of caprolactone and trimethylol propane. The molecular weight of the polyester polyol is in the range from about 250 to 3000, preferably from about 350 to 1000. It is also preferable in the invention to utilize a polyester polyol having a urethane polymer glass transition temperature of about 50° F. and 200° F., preferably between about 90° F. and 160° F. The polyester polyol is utilized in an amount ranging from about 1 to 30, preferably from about 5 to 25 percent by weight of the total urethane prepolymer composition.

The glass transition temperatures (Tg) of urethane polymers resulting from reacting the present polyhydroxy compounds with the present isocyanate compounds are disclosed herein due to the present belief that the different Tg's of each individual urethane segment combine to provide the overall stability and effectiveness of the present urethane prepolymer-based adhesive. In other words, it is believed that the combination of the relatively amorphous (low Tg) polyalkylene ether diol and triol-based urethane segments with a relatively crystalline (high Tg) polyester polyol-based urethane segment causes the overall urethane prepolymer to exhibit the unusual effectiveness of the present adhesive, especially when applied to fabric-like materials.

In order to ensure the proper selection of polyhydroxy compounds for use in the present invention, the Tg of a resulting urethane based on the particular polyhydroxy compound can be estimated by using the melting point of the particular polyhydroxy compound according to methods known in the art, and the Tg of the resulting urethane can then be verified according to equally well-known methods. It is essential to the performance of the present adhesive that polyhydroxy compounds are selected that will result in urethane segments having Tg's in the ranges, and particularly the preferred ranges, disclosed above.

As is known in the art, various fillers, extenders, plasticizers, thickners, catalysts, pigments, inhibitors, antioxidants, and the like can be included in the compositions of the present invention. For example, typical fillers include silicates of talc and clay, calcium carbonate, whiting, etc.; typical pigments include $TiO_2$, etc.; typical plasticizers include phthalates, adipates, azelates, etc.; typical catalysts include Sn, etc; and typical antioxidants include hindered polyphenols such as the antioxidants sold under the tradenames IRGANOX and AOX by Ciba Geigy Corporation. Although not required, UV stabilizers such as substituted hydroxphenyl benzotriazoles may be utilized in the present invention to enhance the UV stability of the final composition. An example of a commercially available UV stabilizer is the stabilizer sold by Ciba Geigy Corporation under the tradename TINUVIN.

The polyurethane prepolymers of the present invention are typically prepared by combining the polyol components together and then adding the aliphatic isocyanate compound to the polyol mixture at a temperature between about 60° F. and 250° F., preferably between about 100° F. and 160° F., to form a high viscosity prepolymer. When selecting the amounts of isocyanate and polyhydroxy compounds to be used, it is preferable to create in the mixture a NCO:OH functionality ratio of between about 1.05:1 and 10.00:1, preferably between about 1.50:1 and 4.00:1. The reaction is preferably carried out in an inert atmosphere (e.g., nitrogen) in the presence of a dry, non-reactive organic solvent. Typical solvents for use in the invention include aromatic solvents such as toluene and ketone solvents such as methylethyl ketone. The components of the invention can also be combined without the use of a solvent. It is important to ensure that the prepolymer is maintained free of moisture during storage and prior to application of the prepolymer as an adhesive. This is typically accomplished by storing the prepolymer in an inert nitrogen atmosphere so as to ensure the one-package stability of the mixture of polyols and isocyanate compound.

The prepolymer is utilized as an adhesive by applying the high viscosity mixture as a hot melt at a temperature of between about 100° and 180° F. as is known in the art. In order to apply the present adhesive to bond fabric-like materials together, the hot melt adhesive is extruded as a thin film on one layer of fabric, after which a second layer of fabric is pressed against the coated layer of fabric using rollers such as nip rolls or a platen press as is known in the art. The bonded two-layer fabric assembly is then allowed to cure in the presence of ambient moisture (or with additional moisture) for a period of time ranging from about 1 to 15 hours.

The adhesive compositions of the present invention can be applied to various materials and substrates including woven and nonwoven fabric, wood, metal, leather, and plastic. The present adhesive compositions produce adhesive bonds which withstand environmental conditions such as high heat, high humidity and sustained UV radiation. The bonds produced by the present adhesive will not discolor opaque, transparent or translucent materials and minimize premature depolymerization or hydrolysis. Furthermore, the adhesive compositions exhibit exceptional non-blocking character so as to facilitate the application to multi-fold fabric-like materials. Although preferably utilized in the bonding of fabric-like materials, the present compositions may also be used as ambient cure coatings, primers for adhesives, etc. when utilized with the substrates described above.

The following examples are presented in order to further illustrate the invention but are not intended to limit, in any manner, the scope of the invention.

EXAMPLE 1

To a glass-lined reactor are charged 16.4 grams of polypropylene ether triol (MW 440), 26.6 grams of polytetramethylene ether diol (MW 650), and 23.2 grams of polycaprolactone triol (MW 540). The resulting mixture is vacuum degassed at 100° C. for ½ hour followed by cooling to room temperature and a nitrogen purge. To the cooled mixture is then added 0.2 grams of Sn catalyst, followed by the addition of 64.8 grams of bis(4-isocyanatocyclohexyl) methane. The reaction mixture is then exothermed to approximately 120° C. and maintained at this temperature until the desired theoretical NCO value is reached as determined by titration. The resulting high viscosity prepolymer is degassed and stored under nitrogen.

The prepolymer prepared above is extruded as a hot-melt, thin-film at a temperature of 120° onto a nonwoven polyester fabric. To the coated fabric is applied a second layer of nonwoven polyester fabric, and the two pieces of fabric are pressed together by nip rolls. The bonded fabric layers are allowed to cure for a period of about 12 hours in the presence of ambient moisture.

Bonded fabrics are prepared as in Example 1 using the following amounts (grams) of ingredients for Examples 2-7. Any antioxidants and/or UV stabilizers are added after degassing the polyols or after the isocyanate-polyol reaction is completed but prior to final degassing and storage.

EXAMPLE 2

| | |
|---|---|
| Polypropylene ether triol of 440 m.w. | 12.4 |
| Polytetramethylene ether diol of 650 m.w. | 28.8 |
| Polycaprolactone triol of 540 m.w. | 8.0 |
| Bix(4-isocyanatocyclohexyl)methane | 49.3 |
| Sn catalyst | 0.2 |
| Antioxidant* | 0.25 |
| Tinuvin 328 | 0.5 |
| Tinuvin 765 | 0.5 |

*Antioxidants include ADX 330, IRGANOX 1010 and IRGANOX 245, all of which exhibit essentially the same performance.

EXAMPLE 3

| | |
|---|---|
| Polypropylene ether triol of 440 m.w. | 16.4 |
| Polytetramethylene ether diol of 650 m.w. | 26.6 |
| Polycaprolactone diol of 400 m.w. | 23.2 |
| Bis(4-isocyanatocyclohexyl)methane | 64.8 |
| Sn catalyst | 0.2 |

EXAMPLE 4

| | |
|---|---|
| Polypropylene ether triol of 440 m.w. | 16.4 |
| Polytetramethylene ether diol of 650 m.w. | 26.6 |
| Polycaprolactone diol of 400 m.w. | 23.2 |
| Bis(4-isocyanatocyclohexyl)methane | 64.8 |
| Sn catalyst | 0.2 |
| Antioxidant* | 0.25 |
| Tinuvin 328 | 0.5 |
| Tinuvin 765 | 0.5 |

*Antioxidants include ADX 330, IRGANOX 1010 and IRGANOX 245, all of which exhibit essentially the same performance.

EXAMPLE 5

| | |
|---|---|
| Polypropylene ether triol of 840 m.w. | 20.2 |
| Polytetramethylene ether diol of 1000 m.w. | 30.8 |
| Polycaprolactone triol of 540 m.w. | 5.0 |
| Isophorone diisocyanate | 31.0 |
| Sn catalyst | 0.2 |

EXAMPLE 6

| | |
|---|---|
| Polypropylene ether triol of 440 m.w. | 12.4 |
| Polytetramethylene ether diol of 650 m.w. | 28.8 |
| Hexane diol phthalate ester diol of 800 m.w. | 5.0 |
| Hexamethylene diisocyanate | 29.4 |
| Sn catalyst | 0.2 |

EXAMPLE 7

| | |
|---|---|
| Polypropylene ether triol of 440 m.w. | 12.4 |
| Polytetramethylene ether diol of 650 m.w. | 28.8 |
| Hexane diol phthalate ester diol of 800 m.w. | 5.0 |
| Hexamethylene diisocyanate | 29.4 |
| Sn catalyst | 0.2 |
| Antioxidant* | 0.25 |
| Tinuvin 328 | 0.5 |
| Tinuvin 765 | 0.5 |

*Antioxidants include ADX 330, IRGANOX 1010 and IRGANOX 245, all of which exhibit essentially the same performance.

The bonded fabrics prepared in accordance with Examples 1-7 were subjected to the various tests described below.

Humidity Exposure Test

A three-inch wide by ten-inch long fabric sample is suspended over open water in a humidity chamber for the duration of the test. A 150-gram weight is used to extend the fabric sample. The air temperature is maintained at 187°±3° F. Greater than 95% humidity is assumed under these conditions. A sample is considered to have passed the test if there is no observable deterioration of glue lines or fabric for a test period of 500 hours.

Dry Heat Exposure Test

A three-inch by ten-inch piece of fabric is left hanging in an oven for 120 hours. The fabric is kept in a fully extended position by attaching a 150-gram weight to the bottom. The oven temperature is maintained at 250°±2° F. during this period. A fabric is considered to have passed the test if there is no observable deterioration of fabric or glue lines during the test period.

UV Radiation Exposure Test

A sample of the glue line of a fabric sample is exposed to fluorescent lamps (peak wavelength at 320 nm) for a period of 72 hours. The amount of yellowing is then noted. A fabric is considered to have passed the test if there is no noticeable browning or yellowing during the test period.

Overall Weather Exposure Test

The final test for glue line yellowing, and overall durability test is 1500 hours of exposure in an Atlas Ci-65 Weatherometer. The glue lines are examined after a period of 500 hours for glue line yellowing and strength. The conditions of exposure are listed below:

| Exposure Conditions: | |
|---|---|
| Machine | Atlas Ci-65 |
| Lamp | Water cooled Xenon Arc (6500 W) |
| Filters | |
| Inner | Borosilicate |
| Outer | Soda Lime |
| Spectral Irradiance | 1.10 W/m2 at 420 nm |
| Black Panel Temp. | 70 C. |
| Relative Humidity | 15 to 45% varied daily |

A fabric is considered to have passed the test if there is no loss of bond strength or yellowing of the glue line during the test period.

Test Results

Each of the fabric samples prepared in accordance with Examples 1-7 passed all four of the above tests. In addition, the adhesive bonds on all of the fabric samples did not block or diffuse onto an adjacent layer of fabric when forced against the adjacent fabric layer by an approximately 450-gram weight at approximately 168° F. for one hour.

As can be seen from the above data, the adhesive composition of the present invention produce non-blocking adhesive bonds that exhibit suprisingly effective resistance to sustained environmental exposure.

The foregoing discussion is an explanation of the details of the presently preferred embodiments of the present invention and does not in any manner limit the actual scope of the invention which is more appropriately determined by the following claims.

What is claimed is:

1. An adhesive composition comprising a polyurethane prepolymer consisting essentially of the reaction product of a polyalkylene ether diol, a polyalkylene ether triol, a polyester polyol, and an isocyanate compound.

2. An adhesive composition according to claim 1 wherein the polyalkylene ether diol is selected from the group consisting of polytetramethylene ether diol, polyethylene ether diol, polypropylene ether diol, polybutylene ether diol, and polyethylene propylene ether diol.

3. An adhesive composition according to claim 1 wherein the polyalkylene ether triol is selected from the group consisting of polypropylene ether triol, polybutylene ether triol, polyethylene ether triol, polytetramethylene ether triol, and polyethylene propylene ether triol.

4. An adhesive composition according to claim 1 wherein the polyester polyol is selected from the group consisting of polycaprolactone, 1,6-hexane diol phthalate polyester diol, 1,6-hexane diol adipate diol, and 1,6-hexane diol ethylene glycol adipate diol.

5. An adhesive composition according to claim 1 wherein the isocyanate compound is selected from the group consisting of bis(4-isocyanatocyclohexyl)methane, hexamethylene diisocyanate, 2,2,4-trimethylhexamethylene-1,6-diisocyanate, isophorone diisocyanate, hexamethylene-1,6-diisocyanate, 1,4-cyclohexane diisocyanate, 1,4-bis(isocyanatomethyl)cyclohexane, and m-xylene diisocyanate.

6. An adhesive composition according to claim 2 wherein the polyalkylene ether diol is polytetramethylene ether diol prepared from a ring-opening reaction of tetrahydrofuran.

7. An adhesive composition according to claim 3 wherein the polyalkylene ether triol is polypropylene ether triol prepared from a ring-opening reaction of propylene oxide.

8. An adhesive composition according to claim 4 wherein the polyester polyol is a polycaprolactone triol prepared from the reaction of caprolactone and trimethylol propane.

9. An adhesive composition according to claim 5 wherein the isocyanate compound is bis(4-isocyanatocyclohexyl)methane, isophorone diisocyanate, or hexamethylene diisocyanate.

10. An adhesive composition according to claim 2 wherein the polyalkylene ether diol has a molecular weight in the range of about 500 to 2000 and a urethane polymer glass transition temperature in the range of about $-70°$ F. to $-20°$ F.

11. An adhesive composition according to claim 3 wherein the polyalkylene ether triol has a molecular weight in the range of about 200 to 3000 and a urethane polymer glass transition temperature in the range of about $-70°$ F. to $-20°$ F.

12. An adhesive composition according to claim 4 wherein the polyester polyol has a molecular weight in the range of about 250 to 3000 and a urethane polymer glass transition temperature in the range of about $50°$ F. to $200°$ F.

13. An adhesive composition comprising a polyurethane prepolymer consisting essentially of the reaction product of from about 20 to about 70 percent by weight of an isocyanate compound, from about 40 to about 60 percent by weight of a polyalkylene ether diol, from about 1 to about 30 percent by weight of a polyalkylene ether triol, and from about 1 to about 30 percent by weight of a polyester polyol.

14. An adhesive composition according to claim 13 wherein the isocyanate compound is present in an amount from about 30 to about 65 percent by weight, the polyalkylene ether diol is present in amount from about 25 to 50 percent by weight, the polyalkylene ether triol is present in an amount from about 10 to about 25 percent by weight, and the polyester polyol is present in an amount from about 5 to about 25 percent by weight.

15. An adhesive composition according to claim 14 wherein the polyalkylene ether diol has a molecular weight in the range of about 600 to 1000 and a urethane polymer glass transition temperature in the range of about $-40°$ F. to $-60°$ F., the polyalkylene ether triol has a molecular weight in the range of about 300 to 900 and a glass transition temperature in the range of about $-40°$ F. to $-60°$ F., and the polyester polyol has a molecular weight in the range of about 350 to 1000 and a glass transition temperature in the range of about $90°$ F. to $160°$ F.

16. An adhesive composition according to claim 15 wherein the isocyanate compound is bis(4-isocyanatocyclohexyl)methane, the polyalkylene ether diol is polytetramethylene ether diol, the polyalkylene ether triol is polypropylene ether triol, and the polyester polyol is polycaprolactone triol.

17. An adhesive composition according to claim 15 wherein the NCO:OH functionality ratio is between about 1.05:1 and 10.00:1.

18. An adhesive composition according to claim 15 wherein the NCO:OH functionality ratio is between about 1.50:1 and 4.00:1.

* * * * *